Jan. 31, 1961    A. SWANSON    2,969,661
SHEAR PIN UNIT FOR FLEXIBLE COUPLING
Filed Jan. 28, 1958    2 Sheets-Sheet 1
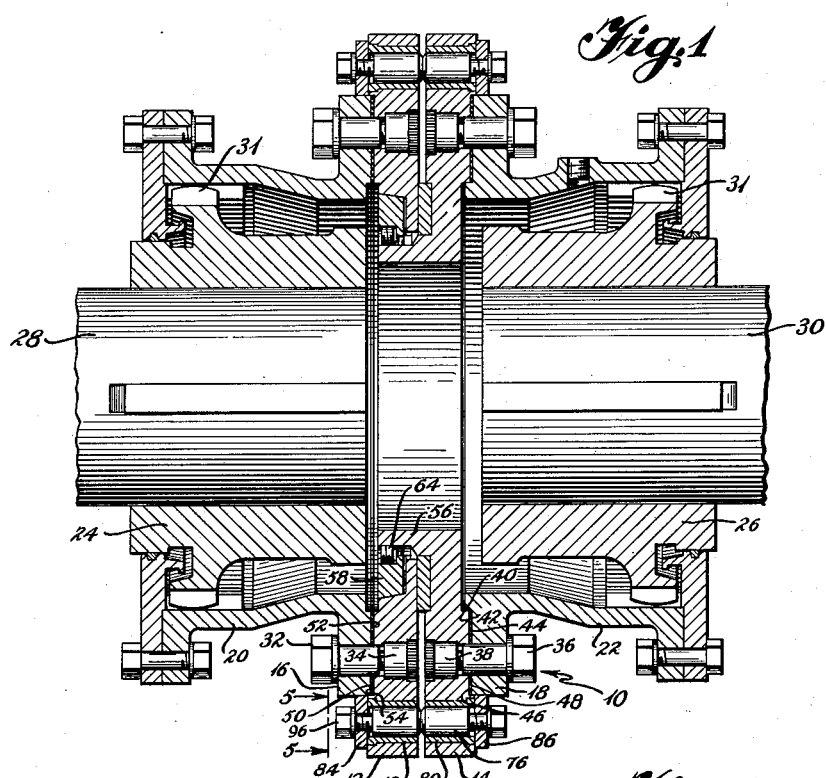
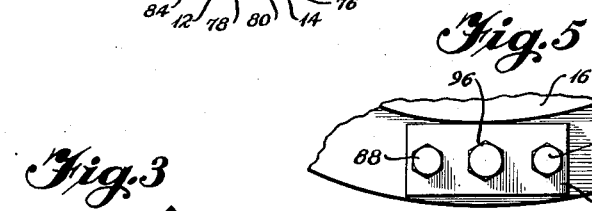
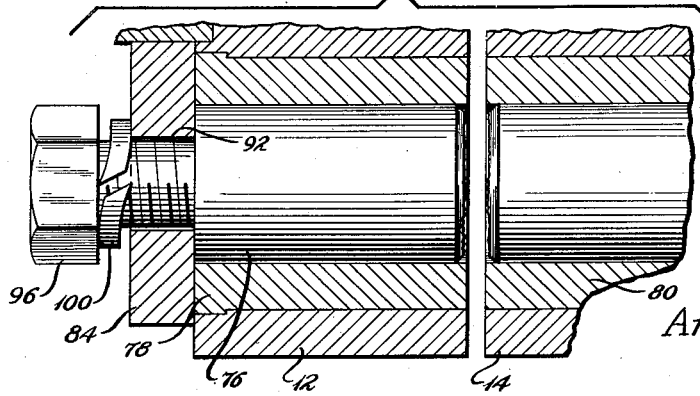
INVENTOR
Arthur Swanson Jan. 31, 1961   A. SWANSON   2,969,661
SHEAR PIN UNIT FOR FLEXIBLE COUPLING
Filed Jan. 28, 1958   2 Sheets-Sheet 2

INVENTOR
Arthur Swanson
BY Church & Church
ATTORNEYS

United States Patent Office 2,969,661
Patented Jan. 31, 1961

2,969,661

SHEAR PIN UNIT FOR FLEXIBLE COUPLING

Arthur Swanson, Towson, Md., assignor to Poole Foundry & Machine Company, Baltimore, Md., a corporation of Maryland Filed Jan. 28, 1958, Ser. No. 711,741

12 Claims. (Cl. 64—28)

This invention relates to shear pin protection for shaft couplings, and more particularly to a self-contained shear pin adapter unit for use with standard and heavy duty gear-type couplings of the double engagement, single engagement, spacer or extended type.

Overload protection of couplings is usually accomplished by shear pins or shear bolts which constitute integral parts of the couplings. In these couplings, shearing elements are sometimes subjected to a combined torsional, tensile and bending stress. On some makes the shear pins are not easily accessible for removal upon shearing, increasing the idle time to replace them and in some cases, the sheared halves may strike each other upon separating under overload conditions and further damage the coupling. In many overload protection mechanisms the lubricant escapes from the coupling when shear pins shear.

It is a major object of this invention to provide a self-contained shear pin adapter unit which may be easily and quickly installed between the end flanges on sleeves and rigids of conventional couplings.

A more specific object of this invention is to provide a shear pin adapter unit which prevents the escape or loss of lubricant from the coupling when the shear pins shear.

Another object of this invention is to provide a shear pin adapter unit in which the shear pin is subject solely to torsional stress.

A further object of this invention is to provide a shear pin adapter unit in which the shear pin, upon breaking under overload stress immediately separates so that the sheared halves of the pins do not strike against each other as the shafts continue to revolve.

In attaining these objects one of the features of the invention resides in the arrangement of a driving member and a relatively rotatable driven member secured together by a shear pin having its shearing section in a space between the opposed surfaces of the driving and driven members. These members of the shear pin adapter are secured to the sleeves of the coupling by step bolts through the flanges on the sleeves. In this self-contained unit, the annular driven member has a central hub carrying a thrust ring engaging the wall of a tapered bore in the driving member which surrounds the hub. Together with a thrust washer between the driving and driven members the thrust ring couples the driving and driven members while permitting relative rotation without the halves separating.

At the outer periphery of the driving and driven members are shear pins axially movable in shear pin bushings extending through each member. Cap screws extend through shear pin washers overlying the exposed ends of the bushings and engage the respective ends of the shear pins. Spring lock washers under the heads of the cap screws continually urge the ends of the pins away from the shearing section to pull the sheared halves apart when the pins break.

These and other objects and features of the invention will become apparent from the specification and accompanying drawings, wherein:

Fig. 1 is a sectional view of a shear pin adapter unit, embodying the invention in its preferred form, and mounted between the sleeves of a standard gear-type coupling;

Fig. 3 is a fragmentary sectional view showing the sheared halves of the shear pin;

Fig. 5 is a sectional view taken on line 5—5 of Fig. 1.

Figure 2:
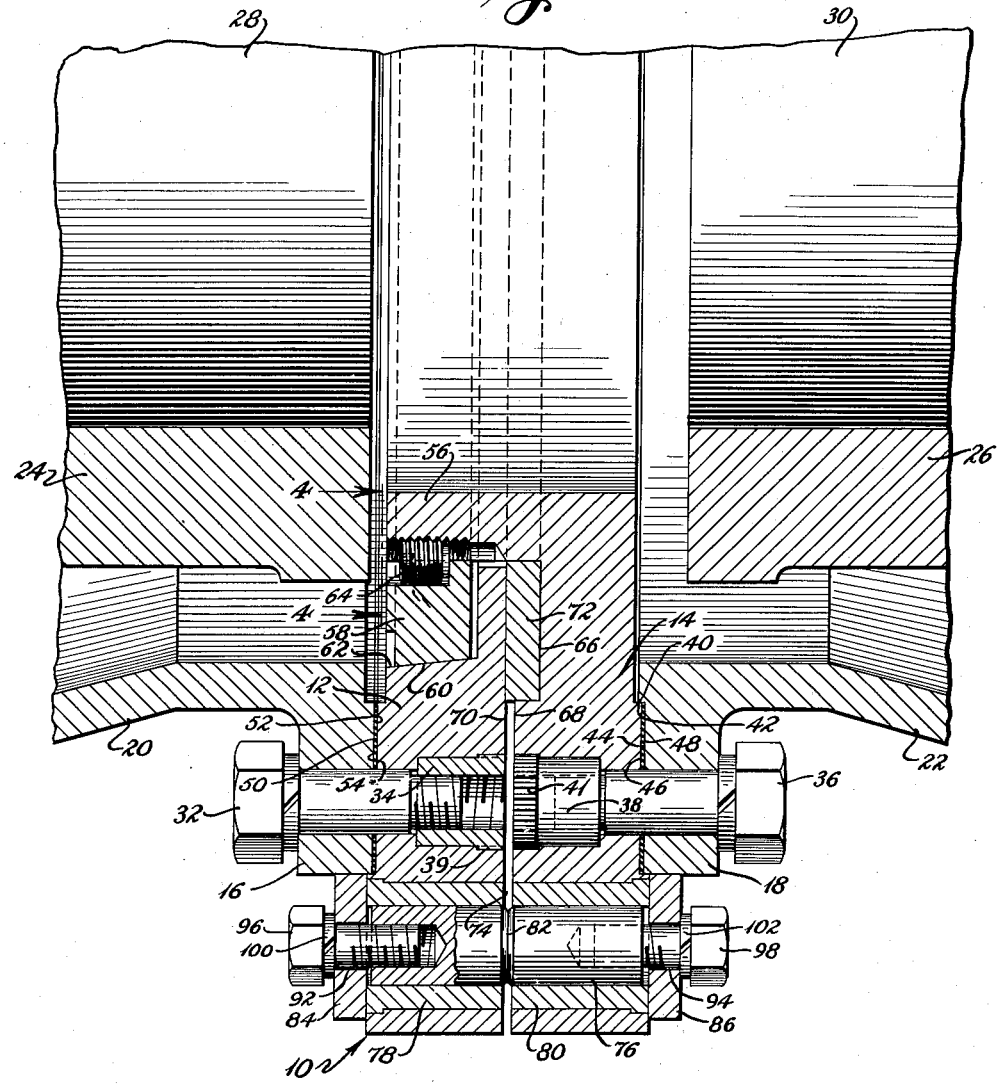
Fig. 2 is an enlarged sectional view of the shear pin adapter unit shown in Fig. 1.
Figure 4:
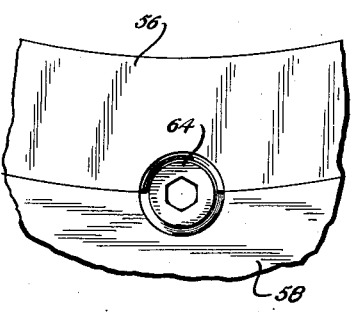
Fig. 4 is an enlarged sectional view taken on line 4—4 of Fig. 2.

Shear pin adapter unit 10 includes an annular driving member 12 and an annular driven member 14 inserted between and secured to the flanges 16 and 18 of coupling sleeves 20 and 22. The coupling illustrated has hub members 24 and 26 secured to the ends of driving shaft 28 and driven shaft 30, and in driving connection by conventional teeth 31, 31 with the sleeves 20 and 22.

Step bolts 32 engaging in Allenuts 34 secure the driving member 12 to the flange 16 of coupling sleeve 20, and similar step bolts 36 engaging in Allenuts 38 secure driven member 14 to the flange 18 of coupling sleeve 22. To prevent turning in the members, the Allenuts 34 and 38 have serrated flanges 39 and 41, respectively.

Annular shoulder 40 on the coupling sleeve 22 abuts a shoulder 42 on the driven member 14 and a gasket 44 is interposed between the opposed surfaces 46 and 48 on the driven member 14 and the flange 18 of the coupling sleeve 22. A similar gasket 50 is arranged between the opposed surfaces 52 and 54 of driving member 12 and the flange 16 of driving sleeve 20.

Extending from driven member 14 within the inner periphery of driving member 12 is a hub 56. An adjustable bearing ring 58 surrounds the hub 56 and has a tapered outer periphery 60 engaging a tapered bore 62 in the driving member 12. Fitted in a recess 66 in the face 68 of driven member 14, surrounding the hub 56 and rotatably engaging the face 70 of driven member 12 is a thrust washer 72 which forms a space 74 between the opposed surfaces 68 and 70 of the members 12 and 14. Bearing ring 58 may be adjusted axially on the hub 56 of driven member 14 by set screws 64 to confine hub 56 between thrust washer 72 and bearing ring 58. Set screws 64 may be staked after being properly set to permit relative rotation between the driving and driven members while preventing relative axial movement between these members. Surfaces of the members 12 and 14 in contact with the thrust washer are moly-koted to reduce friction.

At the outer periphery of the driving member 12 and driven member 14 are shear pins 76 which are axially movable in shear pin bushings 78 and 80 extending in opposed relation through the driving and driven members respectively. At least two shear pins are recommended and additional pins may be used depending upon the load required to shear.

Intermediate the ends of each shear pin is a shearing section 82 disposed within the space 74 between the opposed surfaces 68 and 70 of the driving and driven members. Overlying the exposed ends of the bushings are shear pin washers 84 and 86 secured to the outer surfaces of the driving and driven members 12 and 14 by cap screws 88, 90. These washers have openings 92 and 94 smaller than the shear pin but large enough to freely accommodate cap screws 96 and 98 which are threaded into the respective ends of the shear pin 76. Under the heads of the cap screws are spring-lock washers 100 and 102 which, when cap screws are tightened, continually urge the ends of the shear pins away from the shearing section to pull the sheared halves apart when the pins shear.

As the shear pin adapter unit is self-contained, it can be easily incorporated in present installations using regular gear-type coupling component parts as only one of the coupled units need be moved to install the shear pin adapter. When an installation is originally designed with shear pin protection embodying the invention, the shear pin unit can be removed and replaced by laterally shifting one of the sleeves and without moving either of the coupled units. Locating the shear pins at the outer periphery of the driving and driven members and away from the flanges of the coupling sleeves, makes them readily accessible so that they can be quickly replaced. Further, the shear pins will be subject to torsional stress only and not to a combined torsional, tensile and bending stress. Bearing surfaces of bearing ring 58 and thrust washer 72 on opposite sides of driving member 12 maintain the driving and driven members in fixed axial relation and thereby relieve the shear pins of any tensile or bending forces. When the pins shear, their bearing surfaces permit relative rotation of the driving and driven members which retain them in fixed axial relation to assure continued lubrication of the coupling, even after the driven side stops turning.

The foregoing is one embodiment of the invention and it will be apparent to those skilled in the art that various changes and modifications may be made within the scope of the invention. In this specification and the appended claims, the term "shear pin" is intended to include any shearing element of the shear pin or shear bolt type.

What I claim is:

1. A shear pin adapter unit for mounting between the driving and driven sleeves of a flexible coupling comprising a driving member for attachment to the driving sleeve of a coupling, a driven member for attachment to the driven sleeve of a coupling, said members being arranged with a space between their opposed surfaces, a shear pin having end portions slidably received respectively in said members, a shearing section on said shear pin connecting said end portions to each other and disposed within said space, and means located between each end portion and the associated member resiliently biasing said end portions away from said shearing section.

2. A shear pin adapter unit for mounting between the driving and driven sleeves of a flexible coupling comprising a driving member for attachment to the driving sleeve of a coupling, a driven member for attachment to the driven sleeve of a coupling, said members being arranged with a space between their opposed surfaces, bushings mounted in said members in opposed relation, a shear pin having end portions slidably received in said bushings and a shearing section disposed within said space, bolts extending through the respective members into threaded engagement with the respective end portions of said shear pin, and spring means seated between each bolt and the associated member urging said end portions of said shear pin away from said shearing section.

3. A shear pin adapter unit for mounting between the driving and driven sleeves of a flexible coupling comprising a driving member for attachment to the driving sleeve of a coupling, a driven member for attachment to the driven sleeve of a coupling, said members being arranged with a space between their opposed surfaces, bushings mounted in said members in opposed relation, a shear pin slidably mounted in said bushings having a shearing section disposed within said space between said members, a cover plate mounted on the respective ends of said shear pin, bolts passing through said cover plate and into the respective ends of said shear pin to secure said shear pin to said members, and a spring on said bolts to urge the end portions of said shear pins away from said shearing section.

4. A shear pin adapter unit for mounting between the driving and driven sleeves of a flexible coupling comprising a driving member for attachment to the driving sleeve of a coupling, a driven member for attachment to the driven sleeve of a coupling, bearing means disposed between said members, a thrust washer mounted between the opposed surfaces of said members to maintain said opposed surfaces in axially spaced relationship, and a shear pin slidably mounted in said members having a shearing section disposed within said space, and means engaged between each end portion of said shear pin and the associated member urging the end portions of said shear pin away from said shearing section.

5. A shear pin adapter for mounting between the sleeves of a flexible coupling comprising an annular driving member for attachment to the driving sleeve of a coupling, an annular driven member, a hub on said driven member extending within the inner periphery of said driving member, a tapered bore in said driving member, a tapered bearing ring disposed in said tapered bore and secured to said hub to afford relative rotation between said members and to prevent relative axial movement between said members, and a shear pin having its ends respectively secured to said members.

6. A shear pin adapter unit for mounting between the sleeves of a flexible coupling comprising an annular driving member for attachment to the driving sleeve of a coupling, an annular driven member, a hub on said driven member extending within the inner periphery of said driving member, a tapered bore in said driving member, a tapered ring secured to said hub and engaging said bore affording relative rotation between said members, a thrust washer surrounding said hub and engaging the face of said driven member to space the opposed surfaces of said members, and a shear pin having its ends respectively secured to said members.

7. A shear pin adapter unit for mounting between the sleeves of a flexible coupling comprising an annular driving member for attachment to the driving sleeve of a coupling, an annular driven member, a hub on said driven member extending within the inner periphery of said driving member, a tapered bore in said driving member, a tapered adjustable thrust ring secured to said hub and engaging said bore affording relative rotation between said members, a thrust washer surrounding said hub and engaging a face of said driven member to space the opposed surfaces of said members, and a shear pin having its ends respectively secured to said members.

8. In a flexible shaft coupling having a hub on the driving and driven shafts, driving and driven sleeves respectively encircling said hubs, interlocking elements on said hubs and said sleeves, a shear pin unit comprising a driving member secured to the exposed end of said driving sleeve, a driven member secured to the exposed end of said driven sleeve, bearing means between said members permitting relative rotation and restraining relative axial movement of said members, and a shear pin extending through said members with its ends respectively secured to said members.

9. In a flexible shaft coupling having hubs on the driving and driven shafts, driving and driven sleeves respectively encircling said hubs, and interlocking elements on said hubs and said sleeves, a shear pin unit comprising an annular driven member bolted to said driven sleeve and having a hub projecting toward said driving member, an annular driving member surrounding said hub and rotatably coupled to said driven member, bolt means securing said driving member to said driving sleeve, and a shear pin extending through both of said annular members with its ends respectively secured to said members.

10. In a flexible shaft coupling having hubs on driving and driven shafts, driving and driven sleeves respectively encircling said hubs, and interlocking elements on said hubs and said sleeves, a shear pin unit comprising an annular driven member bolted to said driven sleeve having a hub projecting toward said driving member, an annular driving member surrounding said hub and rotatably coupled to said driven member, bolt means securing said driving member to said driving sleeve, a shear pin extending slidably through both of said annular members with its ends respectively secured to said members by cap screws, and spring lock washers cooperating with said cap screws to continuously urge the ends of said shear pin away from each other on shearing.

11. A shear pin adapter unit for mounting between a pair of axially opposed rotary members of a flexible coupling, said adapter unit comprising first annular member, bolt means for attaching said first annular member to one of said rotary members, a second annular member, bolt means for attaching said second annular member to the other of said rotary members, said annular members projecting radially outwardly beyond the outer peripheries of said rotary members, bearing means extending along the inner portions of said annular members coupling said annular members to each other for relative rotation in spaced opposed axial relationship, a shear pin having end portions extending respectively through said annular members at a location spaced outwardly from said rotary members to rotatively couple said annular members to each other and means engaged between the respective end portions of said shear pin and said annular members biasing said end portions away from each other.

12. A shear pin adapter unit for mounting between a pair of axially opposed rotary members of a flexible coupling assembly, said adapter unit comprising a first annular member, bolt means for securing said first annular member to one of said rotary members, a second annular member, bolt means for securing said second annular member to the other of said rotary members, a hub on said second member projecting through the inner periphery of the first annular member, bearing means on said hub engaging said first annular member to couple said annular members to each other for relative rotation, a thrust washer surrounding said hub and engaging said first annular member to maintain said first annular member in fixed axially spaced relationship with said second annular member, a shear pin having end portions respectively received in said annular members rotatively coupling said members to each other, and means engageable between the respective end portions of said shear pin and said annular members for retracting said end portions from the space between said members upon shearing of said shear pin.

References Cited in the file of this patent

UNITED STATES PATENTS

| | | |
|---|---|---|
| 1,740,617 | Morgan | Dec. 24, 1929 |
| 1,870,153 | Thoman | Aug. 2, 1932 |
| 1,978,209 | Kuhns | Oct. 23, 1934 |
| 2,307,556 | Wileman | Jan. 5, 1943 |